(12) United States Patent
Strasser, Jr. et al.

(10) Patent No.: US 11,735,077 B2
(45) Date of Patent: Aug. 22, 2023

(54) TRANSPORT CONTAINER AND METHOD FOR DISPLAYING DATA ON A TRANSPORT CONTAINER

(71) Applicant: LORRYGRAM GMBH, Eugendorf (AT)

(72) Inventors: Johann Strasser, Jr., Salzburg (AT); Johann Strasser, Sr., Eugendorf (AT)

(73) Assignee: LORRYGRAM GMBH, Eugendorf (AT)

( * ) Notice: Subject to any disclaimer, the term of this patent is extended or adjusted under 35 U.S.C. 154(b) by 307 days.

(21) Appl. No.: 16/496,942

(22) PCT Filed: Mar. 23, 2018

(86) PCT No.: PCT/AT2018/060070
§ 371 (c)(1),
(2) Date: Sep. 23, 2019

(87) PCT Pub. No.: WO2018/170526
PCT Pub. Date: Sep. 27, 2018

(65) Prior Publication Data
US 2020/0086805 A1 Mar. 19, 2020

(30) Foreign Application Priority Data
Mar. 23, 2017 (AT) .......................... GM 50047/2017

(51) Int. Cl.
*G09F 21/04* (2006.01)
*B60R 11/02* (2006.01)
(Continued)

(52) U.S. Cl.
CPC ........ *G09F 21/048* (2013.01); *B60R 11/0229* (2013.01); *G08G 1/095* (2013.01);
(Continued)

(58) Field of Classification Search
CPC ............... G08F 21/048; B60R 11/0229; B60R 2011/004; H04W 4/80; H04W 84/12
See application file for complete search history.

(56) References Cited

U.S. PATENT DOCUMENTS 5,110,021 A * 5/1992 Dawson, Jr. .............. B60P 3/42
296/100.1
8,499,479 B2 * 8/2013 Johnson, Jr. ............ G09F 13/02
40/591
(Continued)

FOREIGN PATENT DOCUMENTS

AT            517056 A1    10/2016
DE     102013208308 A1     5/2014
(Continued)

OTHER PUBLICATIONS

ISA European Patent Office, International Search Report Issued in Application No. PCT/AT2018/060070, dated Jun. 20, 2018, WIPO, 5 pages.

*Primary Examiner* — John D Walters
*Assistant Examiner* — James J Triggs
(74) *Attorney, Agent, or Firm* — McCoy Russell LLP

(57) ABSTRACT

The invention relates to a transport container having:
a frame structure which encloses a transport chamber,
a lateral wall which is connected to the frame structure,
an opening device for converting the lateral wall between a closed position, which lies against the frame structure and in which a lateral loading opening of the frame structure is closed by the lateral wall, and an open position, which releases the lateral loading opening,
a display device for displaying data on the exterior of the lateral wall,
a measuring device for detecting the open position of the lateral wall, and
a release device for releasing the display device for displaying data upon detecting the open position of the
(Continued)

lateral wall. The invention additionally relates to a method for displaying data on a lateral wall of a transport container.

20 Claims, 3 Drawing Sheets

(51) Int. Cl.
  *G08G 1/095* (2006.01)
  *H04W 4/80* (2018.01)
  *B60R 11/00* (2006.01)
  *H04W 84/12* (2009.01)

(52) U.S. Cl.
  CPC ........ *G09F 21/04* (2013.01); *B60R 2011/004* (2013.01); *H04W 4/80* (2018.02); *H04W 84/12* (2013.01)

(56) References Cited

U.S. PATENT DOCUMENTS

| | | | |
|---|---|---|---|
| 10,160,370 B2 * | 12/2018 | Borden | G09F 21/048 |
| 2003/0127876 A1 * | 7/2003 | Matteo Bucco Morello | B60J 5/0498 296/36 |
| 2008/0030427 A1 | 2/2008 | Lanham | |
| 2008/0084360 A1 * | 4/2008 | Shingai | G09F 21/048 345/1.3 |
| 2008/0215415 A1 | 9/2008 | Willms | |
| 2010/0043264 A1 | 2/2010 | Johnson, Jr. | |
| 2012/0017477 A1 * | 1/2012 | Sipperley | G09F 21/04 40/606.03 |
| 2018/0111539 A1 * | 4/2018 | Cohen | G09F 21/048 |

FOREIGN PATENT DOCUMENTS

| | | |
|---|---|---|
| EP | 3048599 A1 | 7/2016 |
| WO | 2016154655 A1 | 10/2016 |

\* cited by examiner

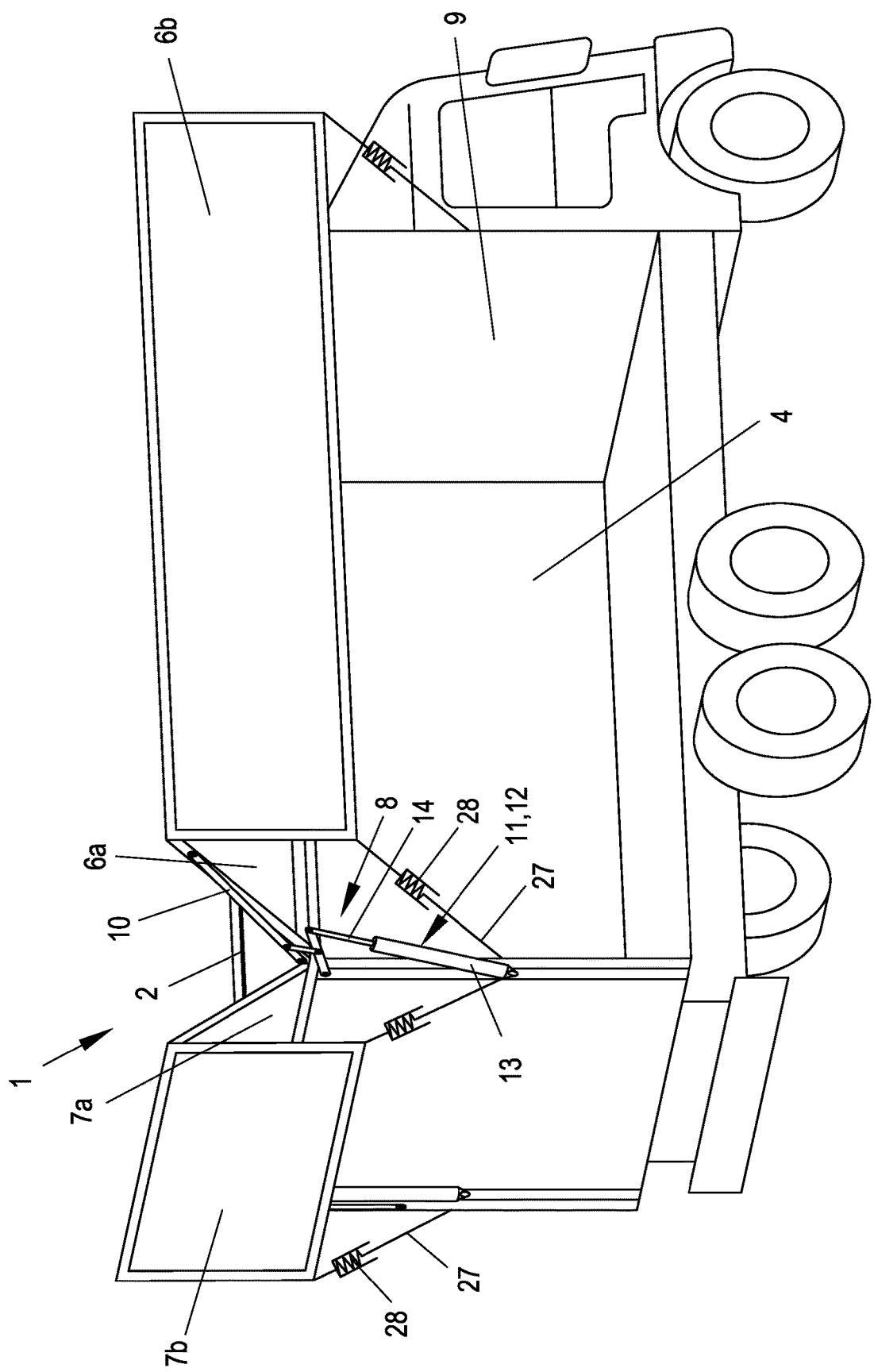

TRANSPORT CONTAINER AND METHOD FOR DISPLAYING DATA ON A TRANSPORT CONTAINER

CROSS-REFERENCE TO RELATED APPLICATIONS

The present application is a U.S. National Phase of International Patent Application Serial No. PCT/AT2018/060070 entitled "TRANSPORT CONTAINER AND METHOD FOR DISPLAYING DATA ON A TRANSPORT CONTAINER," filed on Mar. 23, 2018. International Patent Application Serial No. PCT/AT2018/060070 claims priority to Austrian Patent Application No. GM 50047/2017 filed on Mar. 23, 2017. The entire contents of each of the above-referenced applications are hereby incorporated by reference for all purposes.

TECHNICAL FIELD

The invention relates to a transport container, in particular a vehicle structure or container, comprising:
a frame structure which encloses a transport chamber,
a lateral wall which is connected to the frame structure,
an opening device for converting the lateral wall between a closed position, which lies against the frame structure, in which a lateral loading opening of the frame structure is closed by the lateral wall, and an open position, which releases the lateral loading opening,
a display device for displaying data on an exterior side of the lateral wall.

Furthermore, the invention relates to a method for displaying data on a lateral wall of a transport container.

BACKGROUND AND SUMMARY

In EP 3 048 599 A1, a generic method was already disclosed for displaying data on a lateral surface of a commercial vehicle. The data are thereby selected, depending on the current position of the commercial vehicle and the current alignment of the lateral surface of the commercial vehicle. Thus, the data may contain information relative to a location located in the proximity of the vehicle. This data may, e.g., include prompts to the viewers to turn around at a location, or to pay attention to a location which lies on the opposite side of the vehicle from the viewer. An electronic paper may be used, for example, as a display. It is furthermore described, that the information display may be made dependent on cellular data, which are transmitted by mobile devices in the proximity of the vehicle. The cellular data may provide indications about the interests of the user, so that displays tailored to the user may be depicted.

However, it may disadvantageously not be excluded in the prior art that the display device on the lateral surface of the commercial vehicle is activated in traffic situations that are unsuitable for this. Correspondingly, it may be required, for example, by the relevant supervisory authorities, that the data display is suppressed during travel in order to prevent distraction of other road users.

The object of the invention consists in alleviating or mitigating the disadvantages of the prior art. The invention therefore has the particular goal of creating a transport container and a method, as indicated at the outset, by means of which a stronger control is facilitated over the display of data on the lateral wall of the transport container.

This problem is solved by a transport container with the features of claim 1 and a method with the features of claim 10.

The transport container according to the invention is characterized by
a measuring device for detecting the open position of the lateral wall, and
a release device for releasing the display device for displaying data upon detecting the open position of the lateral wall.

In the method according to the invention for displaying data on a lateral wall of a transport container, at least the following steps are carried out:
converting the lateral wall from a closed position into an open position,
detecting the open position of the lateral wall, and
releasing the display of data on the lateral wall upon detecting the open position of the lateral wall.

Correspondingly, the transport container according to the invention has an operating mode, in which, in the closed position of the lateral wall and during the conversion of the lateral wall from the closed position in the direction of the open position, the display device is blocked for the display of data, like image or video data. The measuring device is additionally equipped to monitor the conversion of the lateral wall from the closed position into the open position. Upon the attainment of the open position of the lateral wall, the measuring device transmits a release signal to the release device, which subsequently releases the display device for the data display. The release signal of the measuring device upon the attainment of the open position is thus a necessary condition in the operating mode so that data may be displayed on the display device. In one preferred embodiment variant, the data display on the display device is activated in the released state of the display device via an operating device. The operating device may be provided, in particular installed, on the transport container, for example, in an associated driver's compartment. Alternatively, the activation of the data display may be carried out via a mobile operating device, for example, via a mobile telephone or a tablet computer. The selection of data for displaying on the display device is preferably not released or an error message is emitted on the operating device if a data display on the display device is initiated at the operating device in its blocked state, i.e., prior to the attainment of the open position of the lateral wall.

Any data, in particular, images and videos, may be displayed on the display device. For example, the transport container is suitable for the display of advertisements, which may also be selected depending on the position and the orientation of the transport container. In addition, it may preferably be provided that the display device communicates with mobile devices in the proximity of the transport container in order to output person-related data on the display device.

To convert the lateral wall from the closed position into the open position, the opening device preferably comprises a drive, in particular a linear drive, preferably a cylinder-piston drive.

To detect the open position of the lateral wall, the measuring device is equipped in one preferred embodiment for detecting an activation duration of the drive. The activation duration of the drive at the initiation of the opening process corresponds with the open state of the lateral wall, so that the attainment of the open position may be reliably inferred via the activation duration.

In another preferred embodiment, the measuring device is equipped to detect an opening angle of the lateral wall. In this embodiment, the open state of the lateral wall is detected via the opening angle of the lateral wall.

In another preferred embodiment, the measuring device is equipped to detect a travel path of the cylinder-piston drive. The travel path of the cylinder-piston drive in the actuated state is applied in a defined way to the conversion of the lateral wall from the closed position into the open position, so that the attainment of the open position of the lateral wall may be determined via the travel path of the cylinder-piston drive from the initiation of the opening process.

In order to allow the display of the data only in the released state, but not in the blocked state of the display device, the release device may comprise an electronic control unit with which the data display is controlled on the display device. Upon detecting the open position of the lateral wall via the measuring device, a release parameter, with which the display device is released for the display of the data, may be set in the electronic control unit. The electronic control unit is connected to a data memory, wherein data may be transferred from the data memory to the display device. The data memory may be provided on the transport container, i.e., locally. However, the data memory may naturally be provided on a server remote from the transport container, wherein the data transmission between the server and the electronic control unit is carried out via a wireless network. In this embodiment, the switching of the display device from the locked state into the released state is implemented exclusively via the software. Furthermore, the electronic control unit may, however, also be equipped to switch the display device on and off, depending on the open state of the lateral wall, in order to release or block the data display on the display device.

To enable telecommunication of the transport container, and to be able to adapt the data in many ways to different applications, a data receiver is provided for receiving transmitted data, for example, cellular data or broadcast data for communication per WLAN or Bluetooth, from a remote communication module, wherein the electronic control unit is equipped to select data for display on the display device depending on the transmission data from the remote communication module. The remote communication module may be provided, for example, on a mobile device, which is carried by a person in the vicinity of the transport container.

In one particularly preferred embodiment, a cargo securing device is provided for securing cargo in the transport chamber, wherein the display device is equipped to display load information with respect to the cargo. Consequently, the loading of the transport container may thus be substantially simplified, in that load information is displayed on the display device, for example, about the type, the amount, the load position, or the load sequence of the cargo. The lateral wall is preferably located at least partially in the open position, for example, in the form of a lower lateral wall part in a vertical operating position, so that the display device is arranged at least partially above and substantially parallel to the lateral loading opening of the transport container during loading of the transport container. Thus, the operating personnel has the display device easily in view when approaching the transport container, so that the loading may be configured substantially more easily with the aid of the load information.

Load information in the form of visual, textual, or symbolic representations of the cargo is particularly preferably displayed on the display device in order to enable simple stowing of cargo at predetermined loading points in the transport chamber of the transport container. It is hereby particularly favorable if the representations of the cargo, for example, in the form of images, pictograms, or written designations, appear directly above the associated loading point for the cargo in the transport chamber. If the loading points are provided at sequential longitudinal positions of the transport chamber, then the representations of the cargo appear on the display device essentially at the same longitudinal position as the loading points in the transport chamber. The longitudinal position hereby relates to the longitudinal axis of the transport container, which extends in one embodiment of the transport container as a vehicle structure in the direction of straight-line travel. The arrangement of the cargo in the suitable loading points by operating personnel is thus essentially simplified. In this embodiment, the longitudinal position of the cargo is therefore illustrated via the display device. If the transport chamber additionally has multiple loading points arranged one over the other, in order to enable a vertical layering of cargo in the transport chamber, then representations of the associated cargo items may be displayed on the display device over each other in the same vertical sequence as the loading points in the transport chamber.

The functionality of the transport container may still be expanded such that the cargo is provided with a data transmitter, which is equipped for data communication with the electronic control unit. Thus, the suitable load information may be autonomously displayed on the display device, if the cargo with the data transmitter is brought to the transport container.

In one particularly preferred embodiment, a detector unit for detecting a secured state of the cargo is provided on the cargo securing device, wherein the display device is equipped for displaying the secured state of the cargo at the cargo securing device. In this embodiment, the secured state of the cargo is detected at the cargo securing device. For example, the detector unit may be equipped to determine the locking state of a locking device of the cargo securing device so that status information dependent on the locking state, for example, a visual or symbolic representation of the locking device in the latched or unlatched locking state, may be indicated on the display device.

To display data above the lateral loading opening, it is favorable if the lateral wall comprises at least one upper lateral wall part and one lower lateral wall part, wherein the upper lateral wall part is connected to the lower lateral wall part via a pivot axis. In this embodiment, the lower lateral wall part is arranged in the open position preferably essentially completely above the lateral loading opening of the transport container, which preferably extends essentially across the entire length of the transport container. By this means, an easy loading of the transport container is enabled, wherein data may be displayed on the display device at the same time.

The display device has at least one first display element, in particular a display, for example, an OLED display (organic light emitting diode), which preferably extends essentially across the entire length of the lateral wall, in particular additionally essentially across the entire height of the lower lateral wall part. The embodiment of the display is, however, not essential for the present disclosure, as the most varied suitable display technologies are available.

In addition, the display device may have a second display element, which preferably extends essentially across the entire height and/or length of the upper lateral wall part.

Finally, the display device may have a third display element, which preferably extends essentially across the entire height and/or length of a vertical rear wall of the transport container.

In one preferred embodiment, the rear wall has at least one upper rear wall part and one lower rear wall part, wherein the upper rear wall part is connected to the lower rear wall part via a pivot axis. The third display element preferably extends essentially across the entire length and essentially across the entire height of the lower rear wall part. In addition, a fourth display element may be provided which preferably extends essentially across the entire length and essentially across the entire height of the upper rear wall part.

For autonomous conversion between the closed position and the open position of the lateral wall, the opening device preferably comprises a lift arm articulately connected to the lateral wall, wherein the drive is equipped for torque transmission to the lift arm.

BRIEF DESCRIPTION OF THE FIGURES

The invention will subsequently be explained in greater detail by way of an exemplary embodiment depicted in the figures.

FIG. 5 shows another embodiment of the transport container with a rear wall, which may be pivoted upwards, and on which information and advertisements may be displayed.

DETAILED DESCRIPTION

Figure 1:
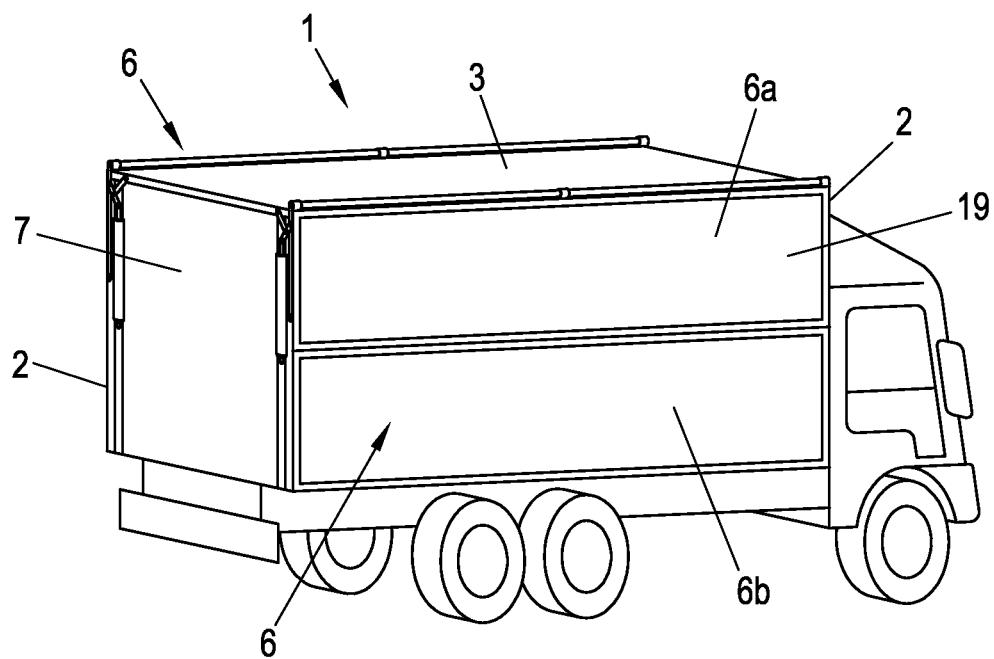
FIG. 1 shows a transport container according to the invention in the form of a vehicle structure with a display device on a lateral wall depicted in the closed position.

FIG. 1 schematically shows an essentially cuboidal transport container 1, which is designed as a vehicle structure for a commercial vehicle in the embodiment shown. Transport container 1 has a frame structure 2 with horizontally and vertically arranged frame parts, merely schematically indicated in the drawings. A roof area 3 is provided on the upper side of frame structure 2. Frame structure 2 of transport container 1 includes a transport chamber 4 for storing cargo 5. Transport container 1 has two lateral walls 6 and a rear wall 7, which delimit transport chamber 4 in the interior of frame structure 2. To load transport container 1, at least one of lateral walls 6 is pivotably mounted about a horizontal pivot axis on frame structure 2. To pivot lateral wall 6, transport container 1 has an opening device 8. Upon opening transport container 1, lateral wall 6 is converted from a closed position (FIG. 1) which lies against frame structure 2, into an open position (FIGS. 2, 3) which is arranged essentially above roof area 3. In the open position of lateral wall 6, a lateral loading opening 9 is released so that transport chamber 4 of transport container 1 may be loaded via lateral loading opening 9. Starting from the open position shown, lateral wall 6 may preferably be pivoted farther into a stowed position which lies essentially on roof area 3 (not shown).

In the closed position according to FIG. 1, lateral walls 6 are arranged in a vertical plane on the longitudinal sides of transport container 1. Lateral walls 6 on the longitudinal sides of transport container 1 are respectively designed as two parts in the embodiment shown, with an upper lateral wall part 6a and a lower lateral wall part 6b. Upper lateral wall part 6a and lower lateral wall part 6b of lateral wall 6 are articulately connected to each other. However, one part lateral walls 6 may also be provided (not shown).

To convert lateral wall 6 between the closed position and the open position, a lift arm 10 is provided, which is mounted on one end around a horizontal pivot axis on frame structure 2, and is connected at the other end to upper lateral wall part 6b of lateral wall 6. In the embodiment shown, the pivot axis of lateral wall 6 on frame structure 2 and the pivot axis of lift arm 10 on frame structure 2 coincide. In the embodiment shown, lift arm 10 is formed by an elongated, fixed-length rod. Lift arm 10 is connected to a drive 11 with which lateral wall 6 is autonomously convertible from the closed position into the open position. Drive 11 has, in particular, a hydraulically actuatable linear drive 12 with a cylinder 13 and a piston 14, wherein piston 14 is displaceable out of cylinder 13 by controlling linear drive 12. Linear drive 12 is articulatedly connected at one end to a vertical frame part of frame structure 2. At the other end, linear drive 12 is connected to a force transmission element 15, which has two lever arms articulatedly connected to each other. The one lever arm is articulately connected at one end to lift arm 10 and at the other end is articulatedly connected to piston 14. The other lever arm is articulately connected at one end to frame structure 2 and at the other end is articulately connected to the one lever arm. Such a design is known from AT 517 056 A1, so that a more detailed description may be set aside here; and the entire contents of the above-referenced document is hereby incorporated by reference.

In the embodiment shown, lateral wall 6 is connected on the side of the pivot axis on frame structure 2 to a torsion shaft element, which is rotationally fixedly coupled to lift arm 10. By pivoting lift arm 10 about the pivot axis between lateral wall 6 and frame structure 2, the torsion shaft element is correspondingly pivoted, so that lateral wall 6 is brought from the closed position into the open position (see FIG. 2). The opening device depicted is merely exemplary; in the prior art, the most varied other embodiments are disclosed with which the lateral wall may be brought into the open position.

In the embodiment shown, transport container 1 additionally has a display device 19 for displaying data on the exterior of lateral wall 6.

Figure 4:
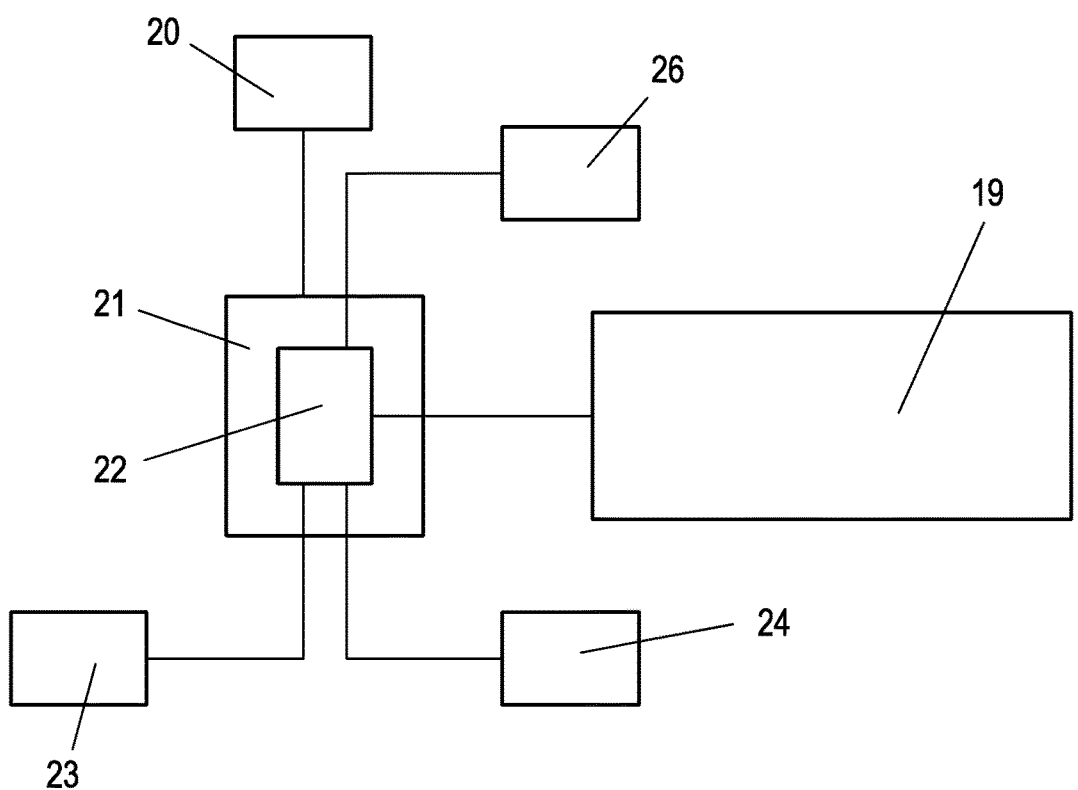
FIG. 4 shows a block diagram with electrical components for controlling the display of data on the display device.

Furthermore, in FIG. 4, a recognizable measuring device 20 is provided for detecting the open position of lateral wall 6. Measuring device 20 communicates with a release device 21, which is equipped to release the display of data in the open position of lateral wall 6, yet to block this in the closed position and in the intermediate positions between the closed position and the open position. This functionality is implemented in the transport container at least as an autonomous operating mode. However, it is conceivable that the transport container may be used in another operating mode, in which the display of data is enabled before the attainment of the open position, in particular already in the closed position. The additional operating mode would be suited, for example, for countries with low levels of government regulations.

Depending on the embodiment, measuring device 20 may, for example, be equipped for detecting an activation duration of drive 11, in order to infer, from the activation duration of drive 11 and the known opening speed of drive 11, that the open position is attained after initiation of the opening process.

Release device 21 has an electronic control unit 22, with which the display of data on display device 19 is controlled. Electronic control unit 22 is connected in the embodiment shown to a local data memory 23, which contains data for displaying on the display device 19. In addition, electronic control unit 22 is connected in the embodiment shown to a data receiver 24, with which transmission data may be received, for example, cellular data or broadcast data for communicating per WLAN or Bluetooth, from a remote communication module, for example, a cellular device. Electronic control unit 22 may control the display on display device 19 depending on the received data.

Figure 2:
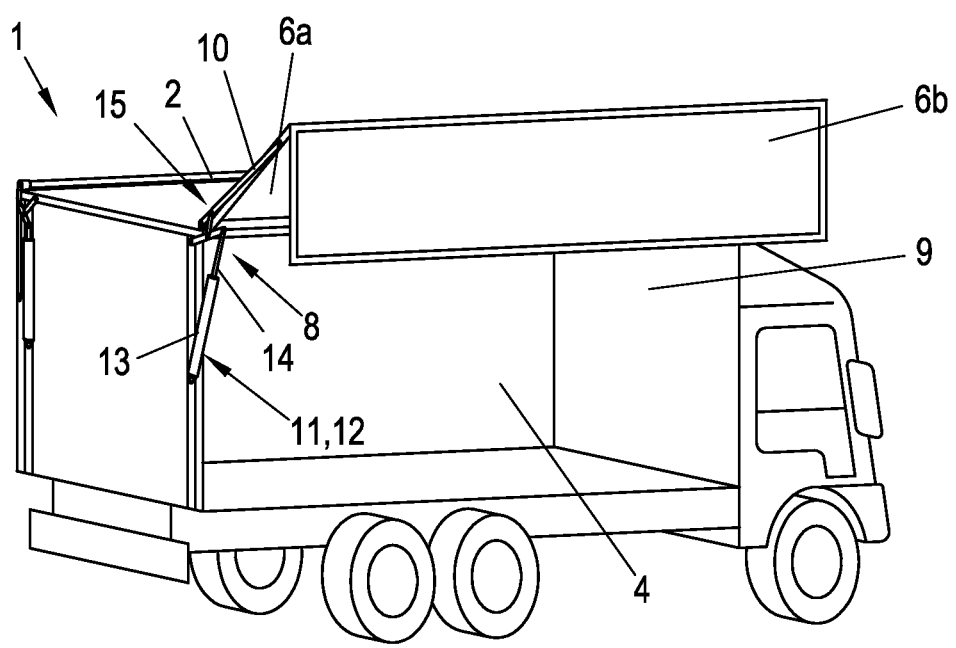
FIG. 2 shows the transport container from FIG. 1 in the open position of the lateral wall.
Figure 3:
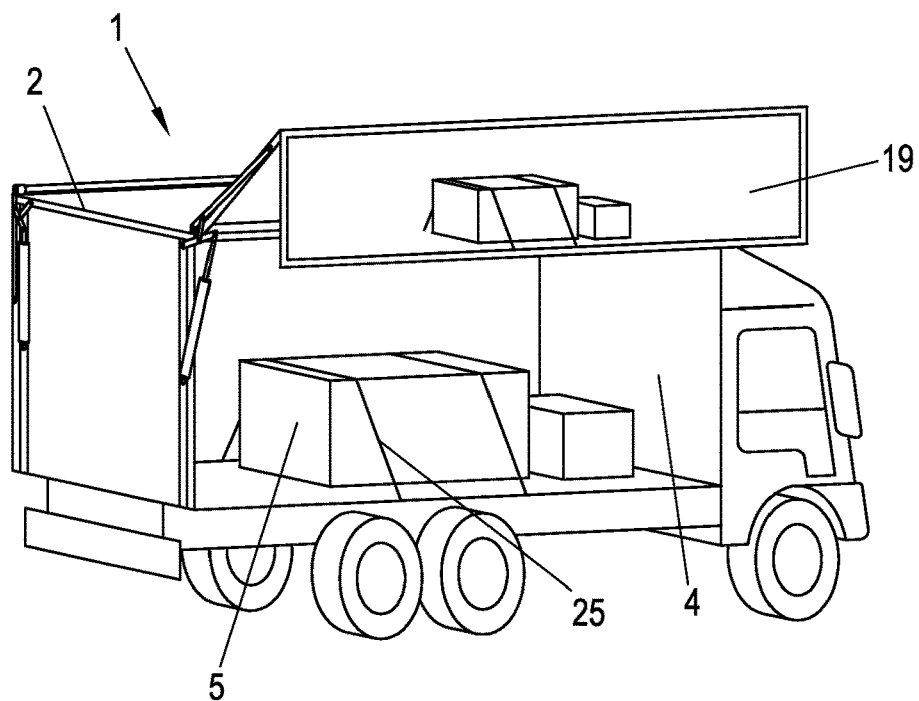
FIG. 3 shows the transport container from FIGS. 1, 2 in the open position of the lateral wall, wherein load information for stowing cargo in the interior of the transport container is displayed on the display device.

FIG. 3 shows a preferred refinement of transport container according to FIGS. 1, 2, wherein a cargo securing device 25 for securing cargo 5 in transport chamber 4 is (schematically) visible. Load information related to cargo 5 is depicted on display device 19. In the embodiment shown, visual depictions of cargo 5 are displayed directly above the associated loading points in transport chamber 4 in order to facilitate the arrangement of cargo 5.

In addition, a detector unit 26 (see FIG. 4) is provided for detecting a secured state of cargo 5 at cargo securing device 25. Detector unit 26 is connected to electronic control unit 22, which is informed by detector unit 26 about the secured state of cargo 5. Thus, the achievement of the secured state of cargo securing device 25 is displayed on display device 19, for example via a symbolic depiction of the proper latching or lashing of cargo 5.

Display device 19 has at least one first display element, which extends preferably essentially across the entire length and height of lower lateral wall part 6*b*. In addition, display device 19 may have a second display element, which may extend essentially across the entire height and length of upper lateral wall part 6*a*.

FIG. 5 shows a modified embodiment of transport container 1, in which rear wall 7 has at least one upper rear wall part 7*a* and one lower rear wall part 7*b*. Upper rear wall part 7*a* is connected to lower rear wall part 7*b* via a horizontal pivot axis. Upper rear wall part 7*a* is connected to frame structure 2 via a horizontal pivot axis, so that rear wall 7 is pivotable between a closed position (not shown) and an open position releasing a rear side loading opening (see FIG. 5). According to the embodiment, display device 19 may have a third display element, which preferably extends essentially across the entire height and length of lower rear wall part 7*b*. In addition, a fourth display element may be provided, which extends preferably essentially across the entire length and height of upper rear wall part 7*a*.

The first, second, third, and/or fourth display element may respectively be a display, for example, an OLED display.

In addition, a rod 27 is schematically visible in FIG. 5, which is articulately connected to the lower end of lower lateral wall part 6*b*. Rod 27 is adjustable in length by means of a spring 28 in order to facilitate a secure arrangement of lateral wall 6 in the closed position. This embodiment is known from AT 404 011 B, so that a more detailed description may be set aside here; and the entire contents of the above-referenced document is hereby incorporated by reference.

The invention claimed is:

1. A method for displaying data on a display device on an exterior of a lateral wall of a transport container, comprising the steps:

converting the lateral wall from a closed position, in which the lateral wall lies on a frame structure and in which a lateral loading opening of the frame structure is closed by the lateral wall, into an open position, in which the lateral loading opening is opened;

detecting the open position of the lateral wall; and releasing the display device for a display of data upon detecting the open position of the lateral wall, wherein converting the lateral wall from the closed position into the open position is effected by an opening device comprising a drive, and wherein converting the lateral wall from the closed position into the open position is effected by a lift arm articulatedly connected to the lateral wall, wherein the drive is equipped for torque transmission to the lift arm, wherein detecting the open position of the lateral wall comprises detecting an activation duration of the drive.

2. The method of claim 1, wherein the lateral wall comprises at least one upper lateral wall and one lower lateral wall part, wherein at least one upper lateral wall part is connected to the one lower lateral wall part via a pivot axis.

3. The method of claim 1, wherein detecting the open position of the lateral wall comprises detecting an opening angle of the lateral wall.

4. The method of claim 1, wherein the drive is a cylinder-piston drive and detecting the open position of the lateral wall comprises detecting a travel path of the cylinder-piston drive.

5. The method of claim 1, further comprising receiving transmission data with a data receiver of an electronic control unit from a remote communication module, wherein the electronic control unit selects data for displaying on the display device depending on the transmission data from the remote communication module.

6. The method of claim 1, wherein the transport container comprises a cargo securing device for securing cargo in a transport chamber enclosed by the frame structure, the method comprising displaying load information with respect to the cargo with the display device, wherein the load information comprises information about the type, the amount, the load position or the load sequence of the cargo.

7. The method of claim 6, comprising:

detecting a secured state of the cargo at the cargo securing device with a detector unit;

displaying the secured state of the cargo at the cargo securing device with the display device.

8. The method of claim 1, wherein in the closed position of the lateral wall and during conversion of the lateral wall from the closed position in a direction of the open position, the display device is blocked for the display of data.

9. The method of claim 1, further comprising activating a data display on the display device in a released state of the display device via an operating device.

10. The method of claim 2, wherein the one lower lateral wall part is arranged in the open position completely above the lateral loading opening of the transport container.

11. A method for displaying data on a display device on an exterior of a lateral wall of a transport container, comprising the steps:

converting the lateral wall from a closed position, in which the lateral wall lies on a frame structure and in which a lateral loading opening of the frame structure is closed by the lateral wall, into an open position, in which the lateral loading opening is opened;

detecting the open position of the lateral wall; and releasing the display device for a display of data upon detecting the open position of the lateral wall, wherein converting the lateral wall from the closed position into the open position is effected by an opening device comprising a drive, wherein converting the lateral wall from the closed position into the open position is effected by a lift arm articulatedly connected to the lateral wall, wherein the drive is equipped for torque transmission to the lift arm, and wherein the transport container comprises a cargo securing device for securing cargo in a transport chamber enclosed by the frame structure, the method comprising displaying load information with respect to the cargo with the display device, wherein the load information comprises information about the type, the amount, the load position or the load sequence of the cargo.

12. The method of claim 11, comprising:

detecting a secured state of the cargo at the cargo securing device with a detector unit;

displaying the secured state of the cargo at the cargo securing device with the display device.

13. The method of claim 11, wherein the lateral wall comprises at least one upper lateral wall and one lower lateral wall part, wherein at least one upper lateral wall part is connected to the one lower lateral wall part via a pivot axis.

14. The method of claim 11, wherein detecting the open position of the lateral wall comprises detecting an activation duration of the drive.

15. The method of claim 11, wherein detecting the open position of the lateral wall comprises detecting an opening angle of the lateral wall.

16. The method of claim 11, wherein the drive is a cylinder-piston drive and detecting the open position of the lateral wall comprises detecting a travel path of the cylinder-piston drive.

17. The method of claim 11, further comprising receiving transmission data with a data receiver of an electronic control unit from a remote communication module, wherein the electronic control unit selects data for displaying on the display device depending on the transmission data from the remote communication module.

18. The method of claim 11, wherein in the closed position of the lateral wall and during conversion of the lateral wall from the closed position in a direction of the open position, the display device is blocked for the display of data.

19. The method of claim 11, further comprising activating a data display on the display device in a released state of the display device via an operating device.

20. The method of claim 13, wherein the one lower lateral wall part is arranged in the open position completely above the lateral loading opening of the transport container.

* * * * *